United States Patent [19]
Takiguchi et al.

[11] Patent Number: 5,841,070
[45] Date of Patent: Nov. 24, 1998

[54] WIRE HARNESS DEVICE FOR INSTRUMENT PANELS

[75] Inventors: Shuji Takiguchi; Keizo Nishitani, both of Shizuoka, Japan

[73] Assignee: Yazaki Corporation, Tokyo, Japan

[21] Appl. No.: 856,233

[22] Filed: May 14, 1997

[30] Foreign Application Priority Data

May 16, 1996 [JP] Japan ................................. 8-121393

[51] Int. Cl.⁶ ............................................. H01B 7/00
[52] U.S. Cl. ............................................. 174/72 A
[58] Field of Search .................. 174/72 A; 361/627, 361/826, 827; 307/10.1; 439/34, 45

[56] References Cited

U.S. PATENT DOCUMENTS

| | | | |
|---|---|---|---|
| 4,974,121 | 11/1990 | Masuko et al. | 361/826 |
| 5,250,758 | 10/1993 | Fjelstad et al. | 174/254 |
| 5,297,334 | 3/1994 | Johnson | 29/861 |
| 5,324,203 | 6/1994 | Sano et al. | 439/34 |
| 5,442,518 | 8/1995 | Beam | 361/690 |

FOREIGN PATENT DOCUMENTS

| | | | |
|---|---|---|---|
| 0307108 | 12/1989 | Japan | 174/72 A |
| 3-203122 | 9/1991 | Japan . | |

*Primary Examiner*—Bot L. Ledynh
*Assistant Examiner*—Joseph Waks
*Attorney, Agent, or Firm*—Armstrong, Westerman, Hattori, McLeland & Naughton

[57] ABSTRACT

A wire harness device for instrument panels in which when a wire harness for an instrument panel and electrical element units are mounted to the instrument panel, a complicated construction for junction units of the harness like the conventional movable connector is unnecessary; little shift exist in position against the element units; and it is easily fixed to improve its maintainability. A wire harness device comprises a plurality of mounting spouts formed on an instrument panel and having electrical element unit inserted from a front surface side of the mounting spout for mounting on the instrument panel; a plurality of junction units on the instrument panel with connecting portion of the electrical element unit connected to the junction unit; and a wire harness for the instrument panel comprising a plurality of junction units and resilient circuit bodies.

5 Claims, 5 Drawing Sheets

WIRE HARNESS DEVICE FOR INSTRUMENT PANELS

BACKGROUND OF THE INVENTION

1. Field of the Invention

The present invention relates to a wire harness device for instrument panels of automobiles in which an assembling work for electrical element units and wire harnesses at the instrument panel and a connecting work between them are improved.

2. Description of the Related Art

To an instrument panel of automobiles are concentrated many instruments such as a speed-meter and a fuel meter, an audio system, a cigarette lighter, an air conditioner, an air bag device, and other electrical elements, and it takes time to mount those elements and to distribute wires therefor, so that many attempts have been done to improve the mounting and wiring works and to make the maintenance of the electrical elements easier through modularization of those elements.

In order to accommodate this modularization, the present applicants have proposed a wire harness device illustrated in FIG. 5 which is disclosed in Japanese Patent Publication (Unexamined) No. Heisei 3-203122. In this device, electrical elements (not shown) are fixed in advance to the rear surface of an instrument panel 51 with screws or the like, and the electrical elements and all are connected and fixed at the same time through a flat rigid circuit body 53 as a wire harness for an instrument panel.

Referring to FIG. 6, bonding agent 55 is spread on a rigid insulation plate 54, for example, and a plurality of circuit conductors 56 are distributed and secured on the insulation plate 54 to form the rigid circuit body 53. If necessary, the rigid circuit body 53 may be protected by an insulation sheet. For the circuit conductor 56 are used an insulating wire such as an enamel wire, and a bare wire. The insulation plate 54, the circuit conductor 56 and the insulation sheet are integrated to form a rigid structure for maintaining a prescribed shape.

Referring to FIG. 5, knock-pins 52 are provided so as to project from both sides of the rear surface of the instrument panel 51, and on both sides of the rigid circuit body 53 are provided connectors 58, 58' with pin receiving holes 57, at positions corresponding to the knock-pins 52, for connecting a wire harness. The connectors 58, 58' are engaged with and connected to connectors 61, 61' for a dashboard harness at the dashboard 59.

At an intermediate portion of the rigid circuit body 53 are provided connectors 62, 62' for connecting the above-mentioned electrical element units. These connectors 62 and 62' are provided with movable portions for absorbing shift in position to connect the single rigid circuit body 53 to the electrical element units.

FIG. 6 shows an example of the movable structure, and the connector 62 consists of a fixed portion 63 to the rigid circuit body 53 and a movable portion 64 capable of moving back and forth and right and left in relation to the fixed portion 63. In the movable portion 64 is accommodated a press-contact terminal 66 which is connected to the circuit conductor 56 in the rigid circuit body 53 and the wire 65. The press-contact terminal 66 is provided with a bending portion 66a for absorbing a shift in position like the wire 65 with a U-shaped portion. That is, the movable portion 64 is movable in a direction of X–Y in relation to the fixed portion 63 through a pin 67, a through hole 68, and a spring 69, and the press-contact terminal 66 positioned inside is also movable through the wire 65 with a shape of a letter U and the bending portion 66a.

The conventional rigid circuit body 53 is provided with the connectors 61, 62' with movable portions for connecting electrical element units, so that it is easy for a car manufacturer to mount them to a car body. On the contrary, the connecting portions of the connectors 62, 62' for electrical element units have faces different from those of the fixed portions of the electrical element units, therefore, the distance that the movable connector (movable portion 64) travels should be long to absorb a shift in position, which causes the construction of the rigid circuit body 53 itself to be complicated, and the rigid circuit body 53 is rigid, so that it is impossible to mount the rigid circuit body 53 along the inner wall of the instrument panel 51, for example, and the rigid circuit body 53 needs to be laid in the air. As a result, the position of the rigid circuit body 53 is easily moved in the instrument panel, which causes problems of poor maintainability of the electrical element units and of restrictions in positions and constructions of various parts, in the instrument panel, such as air ducts.

SUMMARY OF THE INVENTION

The present invention has been made to eliminate the above-mentioned problems and the object thereof is to provide a wire harness device for instrument panels in which when a wire harness for an instrument panel and electrical element units are mounted to the instrument panel, a complicated construction for junction units of the harness like the conventional movable connector is unnecessary; little shift exist in position against the element units; and it is easily fixed to improve its maintainability.

To accomplish the above objectives, the wire harness device for instrument panels according to the present invention comprises: a plurality of mounting spouts formed on an instrument panel, an electrical element unit being inserted from a front surface side of the mounting spout so as to be mounted to the instrument panel; a plurality of junction units accommodated in the instrument panel, a connecting portion of the electrical element unit being connected to the junction unit; and a wire harness for the instrument panel comprising the plurality of junction units and resilient circuit bodies.

In the wire harness device for instrument panels described above, the mounting spout may be provided with a locking portion with an insertion channel on a front side of an inner wall thereof, which opposes the connecting portion of the electrical element unit, and clip holes on a rear side thereof; and the junction unit may be provided with a claw engaging the insertion channel, and clips engaging the clip holes.

Further, in the wire harness device for instrument panels described above, the junction unit may comprise: a plurality of connector terminals, each of the connector terminals connected through press-contacting with a circuit conductor of the circuit body at an end thereof, and the connector terminal having an electrical contact portion at another end thereof; and an insulation case with an upper case and a lower case opposing with each other, the plurality of connector terminals accommodated therein, and the insulation case having connection spouts for the circuit bodies on both sides thereof, wherein the upper case having the claw engaging the insertion channel of the locking portion at a front end edge thereof, and the clips engaging the clip holes at a rear upper surface thereof, and the lower case having an opening where the electrical contact portion of the connector terminal exposes, and an insertion guide opposing the connecting portion of the electrical element unit at both side edges with the opening in between.

Still further, in the wire harness device for instrument panels according to the present invention, unit locking holes can be formed on a surface of the junction unit opposing the electrical element unit, and the electrical element unit can be provided with locking pins inserted into and engaged with the unit locking holes.

Further, in the wire harness device, the upper case of the insulation case may be provided with a plurality of slits in accordance with pitches of the connector terminals; the electrical contact portion of the connector terminal may include a resilient tongue portion integrally formed with a base plate at an end thereof so as to be folded downward; a press-contact piece stands and has a slot at an edge on the rear end portion side of the base plate; tapering insertion guide pieces are formed at tip portions of a forked portion on both sides of the slot; and the press-contact piece in inserted under pressure toward the slit from upside of the circuit body which is mounted on the inner surface of the upper case, and the press-contact piece is secured to the slit so as to be in press-contact with a desired circuit conductor.

Still further, in the wire harness device described above, at positions adjacent to connection spouts for the circuit bodies on both sides of the insulation case, one of opposing surfaces of the upper case and the lower case may be provided with pressing projections, and the other surface is to be provided with clipping channels corresponding to the pressing projection, and the pressing projection and the clipping channel can be engaged with each other to clip and secure the circuit bodies.

With the present invention described above, the circuit bodies of the wire harness device for instrument panels have resilience, so that they can be arranged along the inner wall of the instrument panel, unlike the conventional rigid circuit body. As a result, the problem of restrictions in positions and constructions of various parts in the instrument panel may be eliminated.

Further, the mounting work of the junction units to the mounting spouts of the instrument panel can considerably be easily carried out, since the claw of the junction unit at the tip thereof is inserted into the insertion channel of the locking portion, and the rear portion of the claw is lifted to allow the clips to automatically engage with the clip holes.

Still further, when the electrical element unit is inserted into the mounting spout from the front surface side of the instrument panel, the guide of the insertion guide cases the connecting portion of the electrical element unit to contact the electrical contact portion of the connector terminal in the junction unit, so that the mounting of the electrical element unit and the electrical contact of the junction unit are simultaneously performed.

Further, with the present invention, the electrical element unit and the junction unit is mechanically connected and fixed to each other through the locking pins and the unit locking holes, so that the reliability of the electrical connection between the junction unit and the connecting portion can be improved.

Further, with the present invention, at the connection of the connector terminal and the circuit body with each other, inserting under pressure the press-contact piece into the slit from the upside of the circuit body which is secured on the inner surface of the upper case only allows the press-contact to the circuit connector to be completed, and the press-contact between the press-contact piece and the slit also protects the axial movement of the connector terminal, which permits the wire harness device for instrument panels automatically manufactured with ease.

Still further with the present invention, the circuit body constituting the wire harness device for instrument panels is, in the junction unit, securely supported by the pressing projections of the upper case and the clipping channels of the lower case, which prevents the connector terminal from being subjected to external force, resulting in stable electrical connection.

BRIEF DESCRIPTION OF THE DRAWINGS

The present invention will be more apparent from the ensuring description with reference to the accompanying drawings wherein.

DETAILED DESCRIPTION OF PREFERRED EMBODIMENTS

Now, a wire harness device for instrument panels according to an embodiment of the present invention will be explained with reference to drawings.

Figure 1:
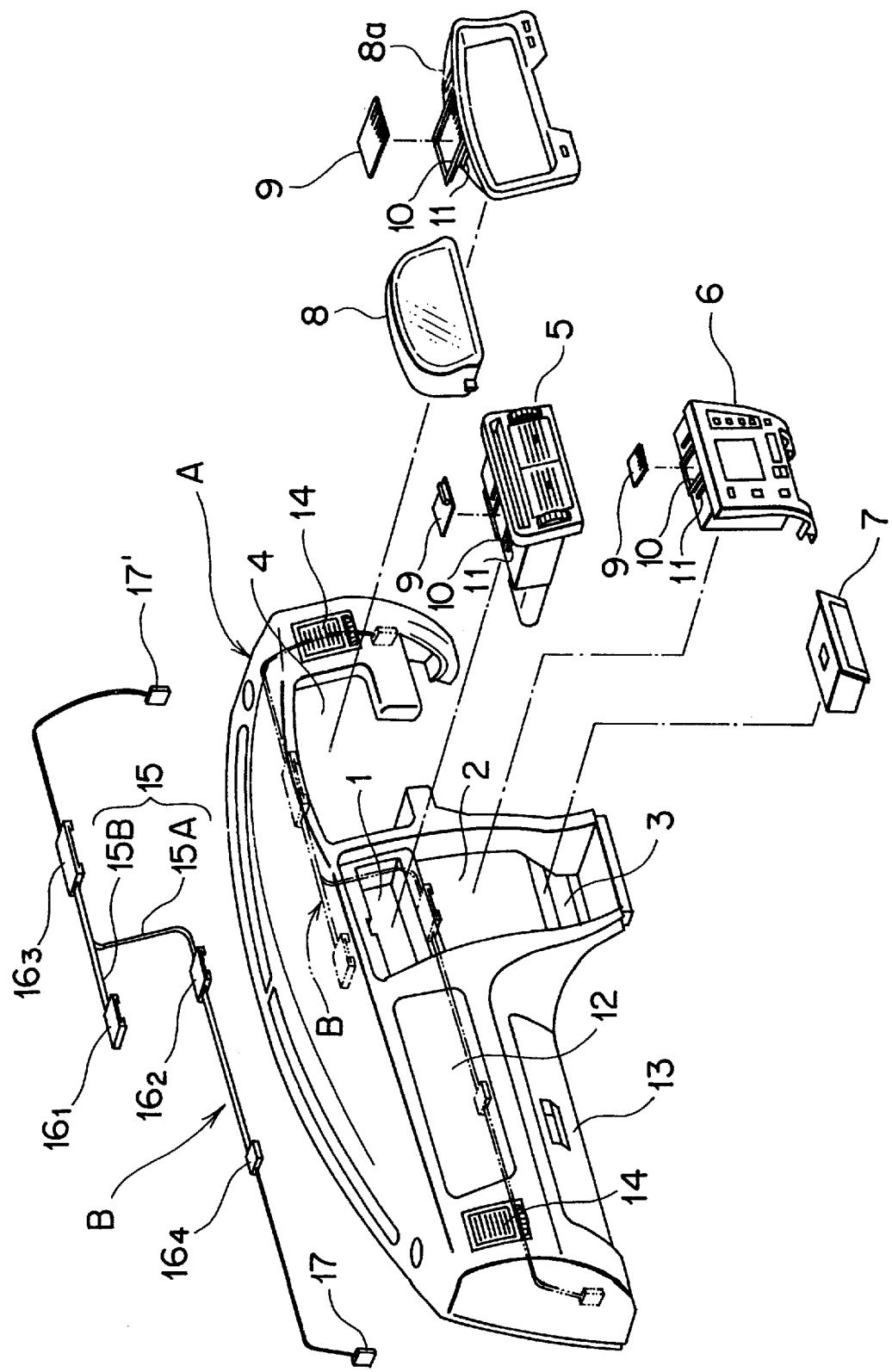
FIG. 1 is an exploded perspective view of a wire harness device for instrument panels according to an embodiment of the present invention.

In FIG. 1, reference symbol A is an instrument panel made of synthetic resin, and B a wire harness for the instrument panel A.

The instrument panel A is formed with a plurality of mounting spouts 1 to 4 at the central portion thereof and on the right side, and to the mounting spouts 1 to 4 are mounted, from the front surface side of the instrument panel A, a central cluster unit 5, a switch unit 6, an ash tray 7, and a disc player 8 with a decoration plate 8a, respectively. At the central portion of the upper surface of each of the electrical elements such as the central cluster unit 5, the switch unit 6, and the disc player 8, a card-edge-type connecting portion 9 is provided, and on both sides of the connecting portion 9 are situated guide projections 10, and at further outside of the guide portions 10 are positioned locking pins 11. At upper left of the instrument panel A is mounted an air bag module 12, and at lower portion thereof is mounted a glove box 13. Reference numerals 14, 14' indicate vent spouts.

The wire harness B for instrument panels comprises a resilient circuit body 15, a plurality of junction units $16_1$, $16_2$, $16_3$ and $16_4$ (representatively indicated as 16) which are connected to the resilient circuit body 15, and connectors 17, 17' for connecting wire harness at the ends of the wire harness for an instrument panel B. The connectors 17, 17' are of generally used type and are connected to an engine room harness and a cowl side harness (not shown).

The circuit body 15 comprises, in an example as illustrated, a long main circuit body 15A with the connectors 17, 17' for connecting harnesses on both sides thereof, and a short sub circuit body 15B, which is branched from the central portion of the main circuit body 15A and is provided with the junction unit 16₁ at an end thereof. This form of branch varies with the number of and the positions of the electrical element units such as the central cluster unit 5 and the switch unit 6 which are connected to the circuit body 15.

Figure 2:
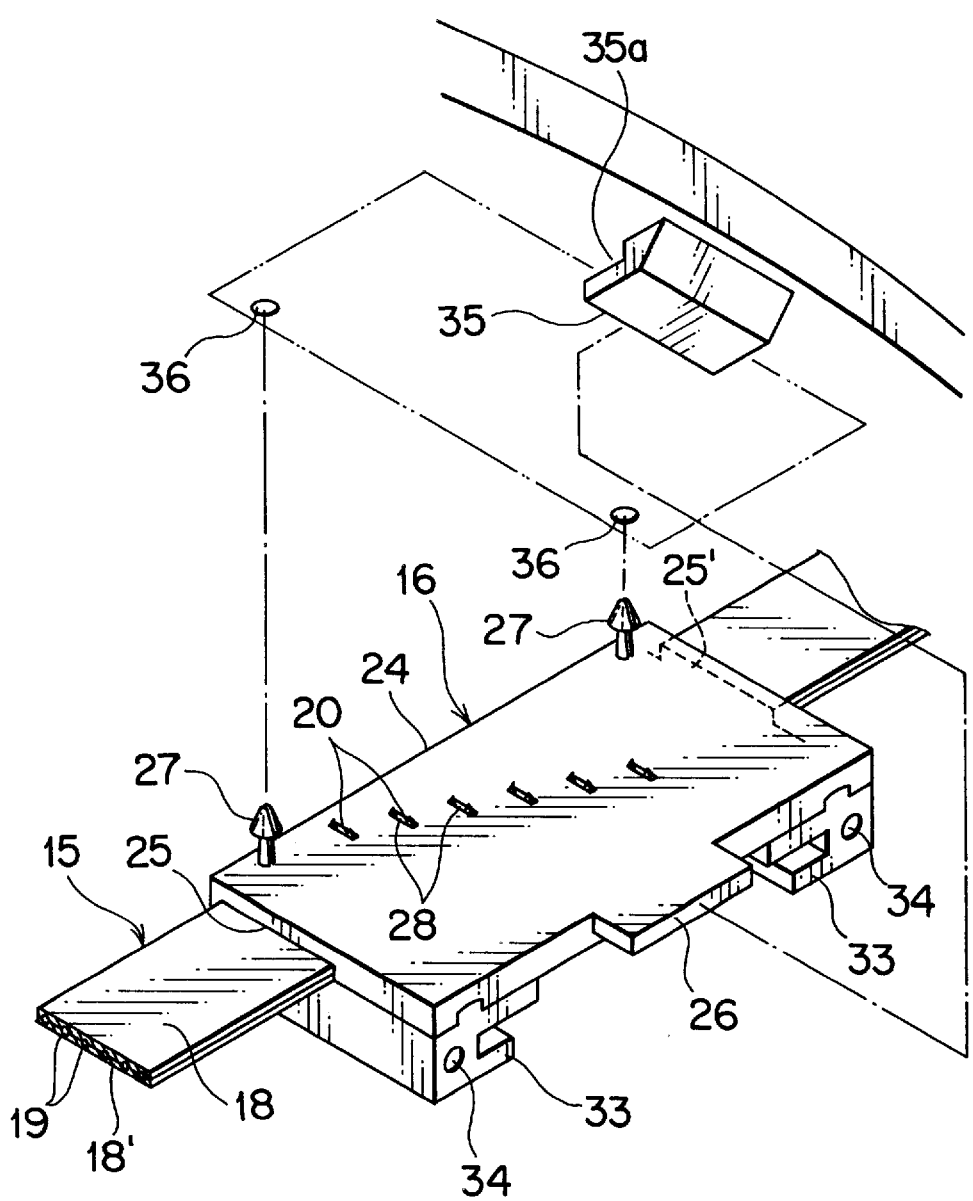
FIG. 2 is an enlarged perspective view of a junction unit and a mounting portion thereof illustrated in FIG. 1.

As illustrated in FIG. 2, a plurality of circuit contacts 19 are positioned on insulating sheet 18 with bonding agent on a surface thereof and a protecting sheet 18' covers the circuit contacts 19 and all to form the circuit body 15 (15A, 15B), so that the circuit body 15 has resilience on the whole. The circuit conductor 19 is made of an enamel wire and a bare wire besides a generally used insulating wire. A flexible flat cable (FFC) on the market may be used for the circuit body 15.

Figure 3:
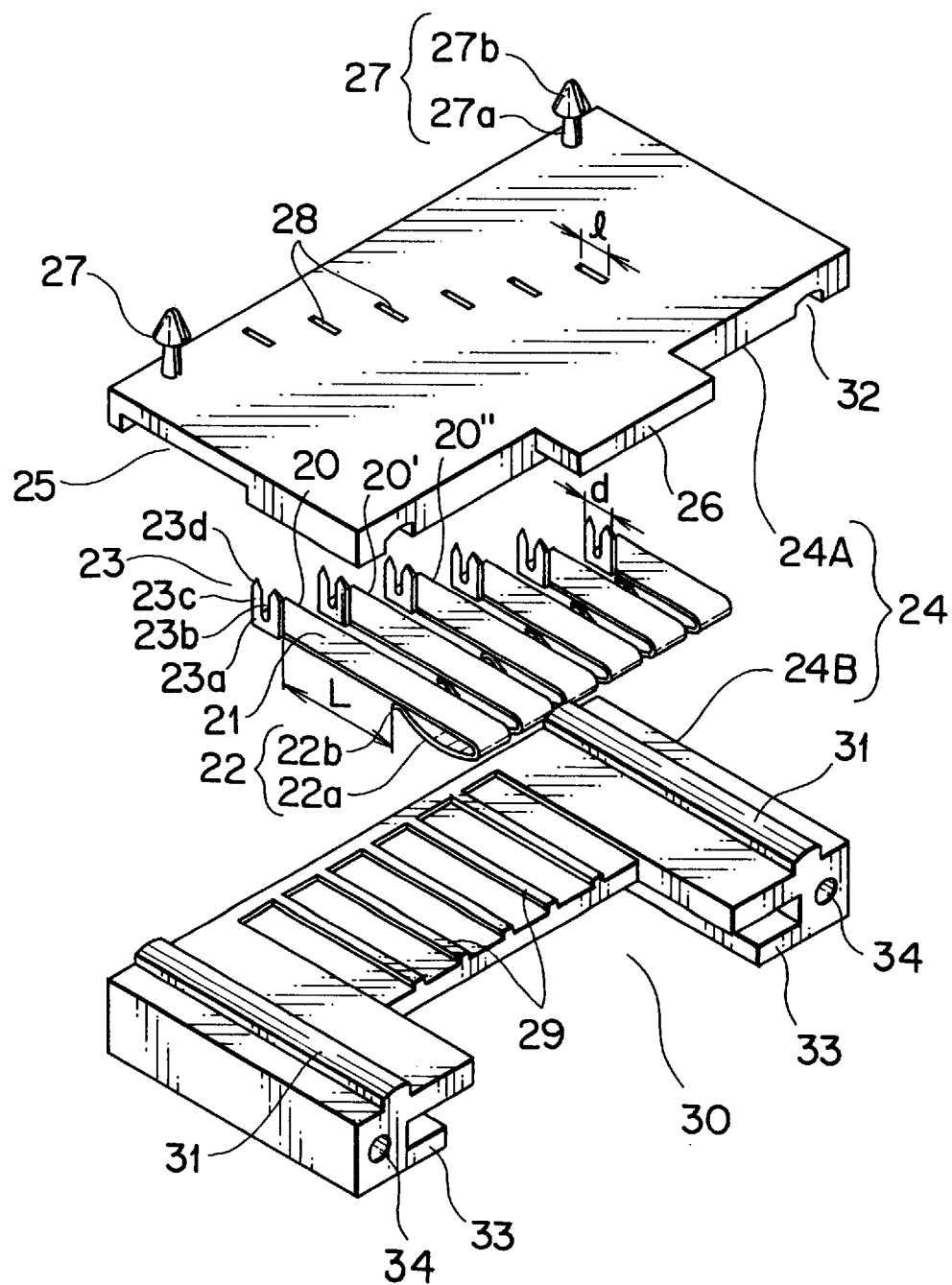
FIG. 3 is a perspective view of the junction unit shown in FIG. 1.

The junction unit 16 consists of, as illustrated in FIG. 3, a plurality of connector terminals 20 and an insulation case 24 for accommodating the connector terminals 20.

The connector terminal 20 is provided with an electrical contact portion 22 at an end of a tab-shaped base plate 21, and is provided with a press-contact portion 23 at another end thereof. The electrical contact portion 22 consists of a resilient tongue portion 22a integrally formed with the base plate 21 at an end thereof so as to be folded downward to form an arch, and a reaction piece 22b which is formed by bending a free end of the electrical contact portion 22a in a direction apart from the base plate 21. The press-contact portion 23 is integrally formed with a press-contact piece 23a which stands and has a slot 23b for press-contacting a wire at an edge on the rear end portion side of the base plate 21, and tip portions of a forked portion 23c on both sides of the slot 23b are formed to function as tapering insertion guide pieces 23d. Several kinds of connector terminals 20 are prepared, of which length L between the reaction piece 22b and the base plate 21 is different from each other, as illustrated with reference symbols 20', 20" for the connection to the circuit conductor 19 of the circuit body 15, FIG. 2.

The insulation case 24, FIG. 2, consists of the upper case 24A and the lower case 24B, FIG. 3, which are opposite to each other, and the both cases 24A, 24B are combined and fixed with each other through screws and nuts (not shown) to provide connection openings 25, 25' for the circuit body 15, FIG. 2, on both sides.

On the front end edge of the upper case 24A, FIG. 3, is formed a claw 26 so as to project therefrom, and on both sides of the upper rear surface of the upper case 24A is formed a clip 27 with a truncated cone head portion 27b at an end of supporting portion 27a with a shapes of round pin. The claw 26 and the clip 27 are engaged with an insertion channel 35a, FIG. 2, of locking portions 35 in the mounting spouts 1 to 4, FIG. 1, described below and a clip hole 36, FIG. 2, respectively. Further, at the intermediate portion of the upper case 24A, FIG. 3, is provided a plurality of slits 28 to which the press-contact pieces 23a of the connector terminals 20 are inserted under pressure. The slits 28 are disposed at prescribed intervals in a direction perpendicular to the circuit conductor 19, FIG. 2, of the circuit body 15. The length 1, FIG. 3, of each of the slits 28 is slightly larger than the width d of the press-contact piece 23a and the width of the slit 28 is preferably equal to or smaller than the thickness of the press-contact piece 23a.

On the other hand, the lower case 24B, FIG. 3, is provided at the rear half portion thereof with a plurality if insulating ribs 29 to insulate the connector terminals 20, and at the front half portion thereof is formed an opening 30 to expose the electrical contact portion 22 of the connector terminal 20. On surfaces opposing to each other near the connection openings 25, 25' of the lower case 24B, FIG. 2, and the upper case 24A, FIG. 3, are formed pressing projections 31 to clip and secure the circuit body 15, FIG. 2, and clipping channels 32, FIG. 3, corresponding to the pressing projections 31.

On the lower surface of the lower case 24B, FIG. 3 are formed channel-shaped insertion guides 33 on both sides thereof with the opening 30 in between, and the channel-shaped insertion guide 33 and the unit locking holes 34, FIGS. 2 and 3, are engaged with the guide portion 10 and the locking pins 11, FIG. 1, respectively.

Figure 6:
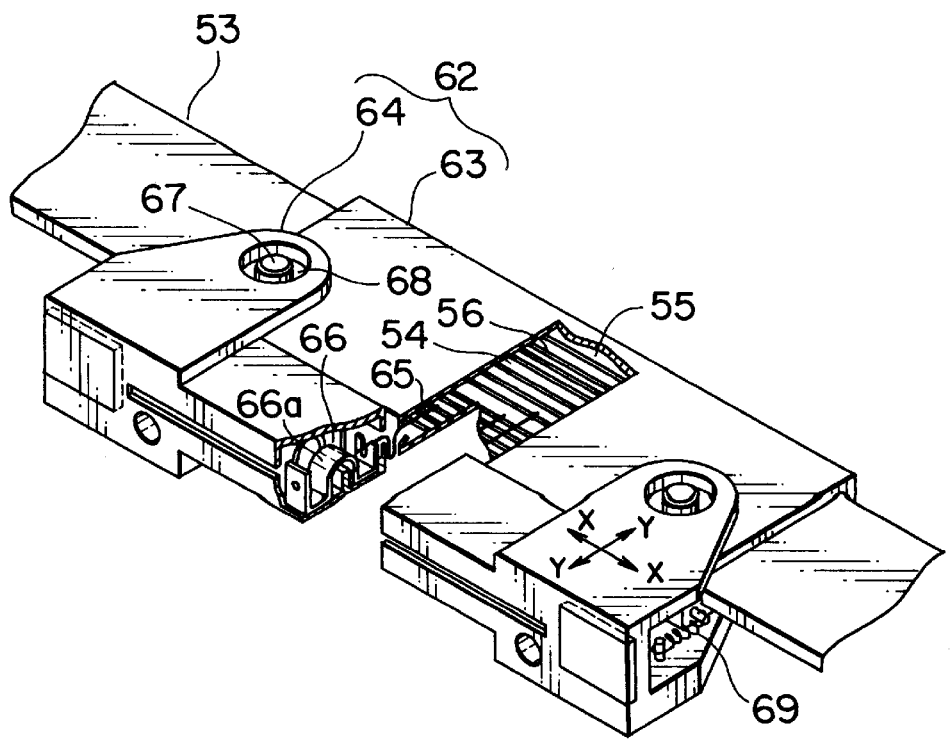
FIG. 6 is a view for explaining the movable structure of a connector for connecting an electrical element.
Figure 5:
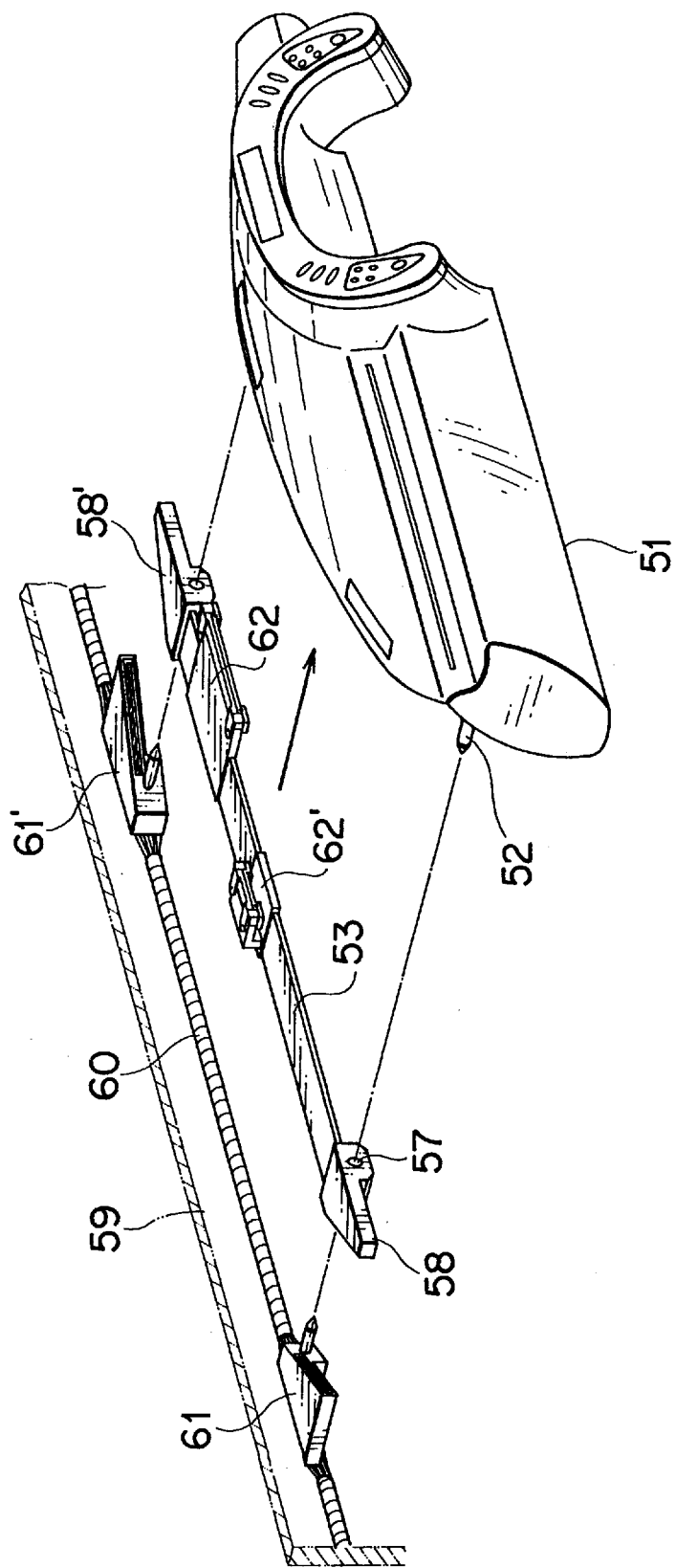
FIG. 5 is a view for explaining a conventional wire harness device for instrument panels.

In connection with the junction units 16 of the wire harness B, FIG. 1, for instrument panels, on the upper walls of the mounting spouts 1 to 4 of the instrument panel A, as illustrated in FIG. 2, are formed locking portions 35 with insertion channels 35a to the claws 26 on the front side thereof, and the clip holes 36 for the clips 27 are formed on the rear side thereof. The insertion channel 35a of the locking portion 35 opens in three directions, right, left, and backward but not forward, FIG. 2, and the claw 26 is slightly movable in a direction of X–Y like the conventional one shown in FIG. 6. The clip hole 36 is formed largely in comparison to the diameter of the supporting portion 27a of the clip 27, and the supporting portion 27a also moves in the clip hole 36 in a direction of X–Y.

With the aforementioned construction, the wire harness B, FIG. 1, for the instrument panels or the junction units 16 are easily assembled or manufactured as described above.

In FIG. 3, the circuit body 15, FIG. 2, is mounted on the inner surface of the upper case 24A, FIG. 3, so as to cross the both connection spouts 25, 25', FIG. 2, and the press-contact piece 23a, FIG. 3, of the connector terminals 20 inserted under pressure into the slits 28 from upside and is secured thereto. As a result, the circuit conductors 19 of the circuit body 15, FIG. 2, are connected to the slot 23b of the press-contact piece 23a, FIG. 3, through press-contact, and simultaneously the press-contact piece 23a is secured to the slit 28.

Figure 4:
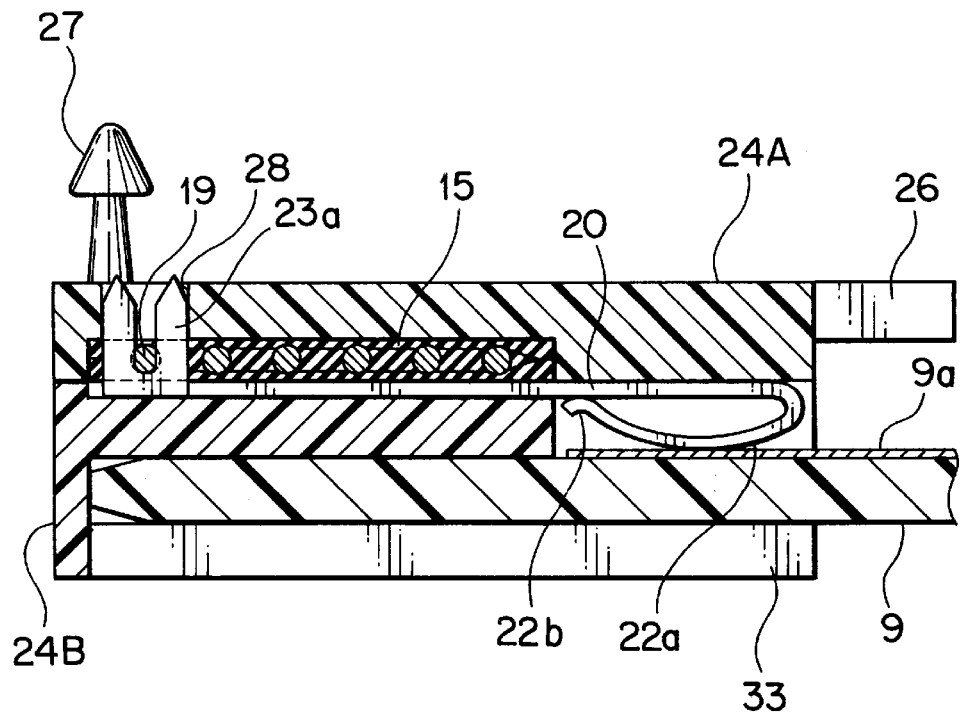
FIG. 4 is a cross-sectional view showing a condition that the junction unit and an electrical element unit are connected to each other.

When the press-contact piece 23a, FIGS. 3 and 4, is pressed to the slit 28 from upside of the circuit body 15, FIGS. 2 and 4, the insertion guide piece 23d at the tip of the forked portion 23c, FIG. 3, breaks the insulation sheet 18 of the circuit body 15 and enters in the slit 28, FIG. 4, and a further pressing causes the circuit conductor 19 to press-contact with the slot 23b, FIG. 3. The length 1 of the slit 28 is larger than the width d of the press-contact piece 23a as described above, so that the forked portion 23c is resiliently movable in relation to the circuit conductor 19 to provide suitable press-contact force, and the slit 28 works as a stopper for the press-contact piece 23a, which prevents the connector terminal 20 from moving in its axial direction and being drawn off. After all the connectors 20, 20', 20" are inserted under pressure and secured, the lower case 24B is combined with the upper case 24A and the both cases 24A and 24B are fixed to each other, FIG. 4, through pins, nuts, or the like, as described above.

As described above, the connections between the circuit body 15, FIGS. 2 and 4, and the connector terminal 20 and between the circuit body 15 and the insulation case 24 can be carried out through simple operation, that is, only press-contacting the connector terminal 20 to the circuit conductor 19, so that it becomes easy to automatically assemble the wire harness B for instrument panels.

The wire harness B for instrument panels manufactured according to the above-mentioned procedure is considerably easily mounted, since the claw 26, FIG. 3, of the junction unit 16, FIG. 2, is inserted into the insertion channel 35a of the locking portion 35 on the upper inner wall of each of the mounting spouts 1 to 4 from the rear side of the instrument panel A shown in FIG. 1, and the rear portion of the claw 20, FIG. 2, is lifted to allow the clips 27 to automatically engage with the clip holes 36. Then, when the resilient insulation sheet 18 of the circuit body 15, FIG. 2, is provided with bonding agent on one side thereof it can be used as it is as described above. On the other hand, when the insulation sheet 18, without bonding agent, is used, it can be attached to and secured to the inner wall of the instrument panel A after applying bonding agent thereon.

When the central cluster unit 5, FIG. 1, is inserted into the mounting spout 1 from the front surface side of the instrument panel A, for instance, the locking pins 11 advance into the unit locking holds 34, FIG. 2, while being guided by the insertion guides 33 of the insulation case 24. Simultaneously, the card-edge-type connecting portion 9 inwardly proceeds in parallel to the lower surface of the lower case 24B, FIG. 3, of the insulation case 24. As a result, as illustrated in FIG. 4, the terminal portion 9a or the connecting portion 9 contacts the resilient tongue portion 22a of the connector terminal 20 which is exposed at the opening 30, FIG. 3.

The junction unit 16, FIG. 2, is slightly movable in a direction of X–Y due to the differences in dimension between the claw 26 and the insertion channel 35a, and between the clips 27 and the clip holes 36, as described above, which permits a shift in position between the electrical element units and the connecting portions 9 to be absorbed with ease.

As explained above, the moment that the central cluster unit 5, FIG. 1, is mounted to the mounting spout 1, the instrument panel A is electrically connected to the junction unit 16, FIG. 2. This goes for the connection between other electrical element units such as the switch unit 6, the disc player 8, and the air bag module 12, and the junction units $16_2$, $16_3$, $16_4$.

What is claimed is:

1. A wire harness device for instrument panels comprising:
   a plurality of mounting spouts formed on an instrument panel, an electrical element unit inserted from a front surface side of each of said plurality of mounting spouts so as to be mounted to the instrument panel;
   a plurality of junction units accommodated in the instrument panel, a connecting portion of the electrical element unit being connected from a front surface side of each of said plurality of junction units; and
   a wire harness for the instrument panel comprising said plurality of junction units and resilient circuit bodies,
   wherein each of said plurality of mounting spouts has a locking portion with an insertion guide on a front side of an inner wall of said locking portion, which opposes said connecting portion of the electrical element unit, and clip holes on a rear side thereof; and
   each of said plurality of junction units is provided with a claw engaging said insertion guide, and clips engaging said clip holes.

2. The wire harness device for instrument panels as claimed in claim 1, wherein said each of said plurality of junction units comprise:
   a plurality of connector terminals, each of said connector terminals connected through press-contacting with a circuit conductor of said circuit bodies at one end thereof, said each of said connector terminals has an electrical contact portion at another end thereof; and
   an insulation case with an upper case and a lower case opposing with each other, said plurality of connector terminals accommodated therein, and said insulation case having connector spouts for said circuit bodies on both sides thereof,
   wherein said upper case having said claw engages said insertion guide of the locking portion at a front end edge thereof, and said clips engaging said clip holes at a rear upper surface thereof, and
   said lower case having an opening where said electrical contact portion of the connector terminal exposes, and an insertion guide opposing said connector portion of the electrical element unit at both side edges with said opening in between.

3. The wire harness device for instrument panels as claimed in claim 2, wherein unit locking holes are formed on a surface of said junction units opposing said electrical element unit, and said electrical element unit is provided with locking pins inserted into and engaged with said unit locking holes.

4. The wire harness device for instrument panels as claimed in claim 2, wherein said upper case of the insulation case is provided with a plurality of slits in accordance with pitches of said connector terminals;
   said electrical contact portion of said connector terminal includes a resilient tongue portion integrally formed with a base plate at an end thereof so as to be folded downward;
   a press-contact piece stands and has a slot at an edge on the rear end portion side of the base plate;
   tapering insertion guide pieces are formed at tip portions of a forked portion on both sides of the slot; and
   said press-contact piece is inserted under pressure toward said slit from upside of the circuit body which is mounted on the inner surface of the upper case, and said press-contact piece is secured to said slit so as to be in press-contact with a desired circuit conductor.

5. The wire harness device for instrument panels as claimed in claim 2, wherein at positions adjacent to connection spouts for said circuit bodies on both sides of said insulation case, one of opposing surfaces of said upper case and said lower case is provided with pressing projections, and the other surface is provided with clipping channels corresponding to said pressing projection, and the pressing projection and the clipping channel are engaged with each other to clip and secure the circuit bodies.

* * * * *